Patented May 30, 1933

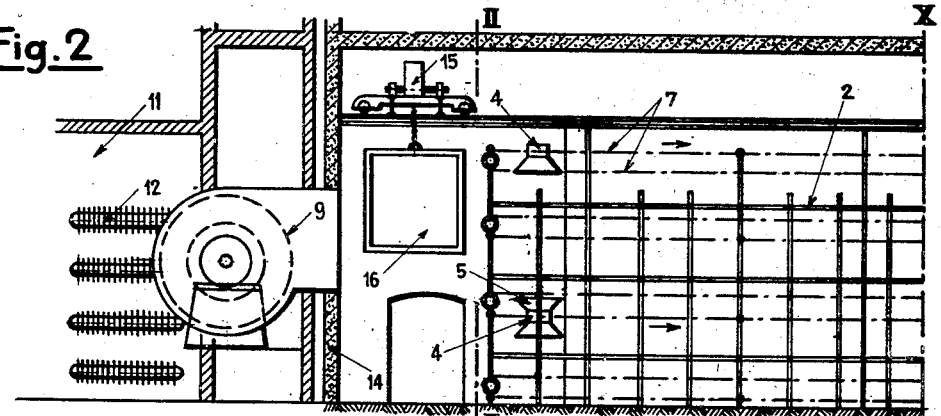
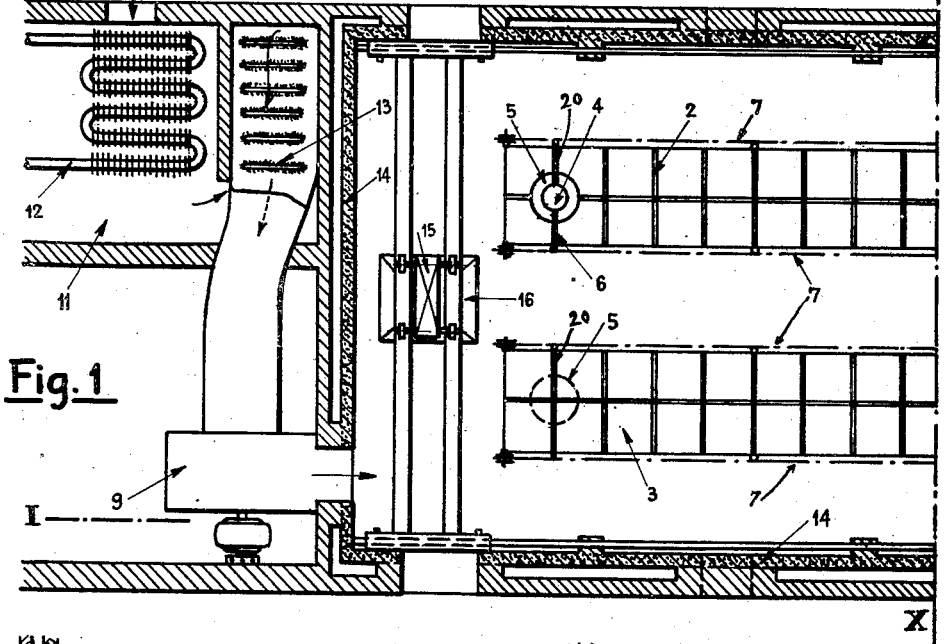
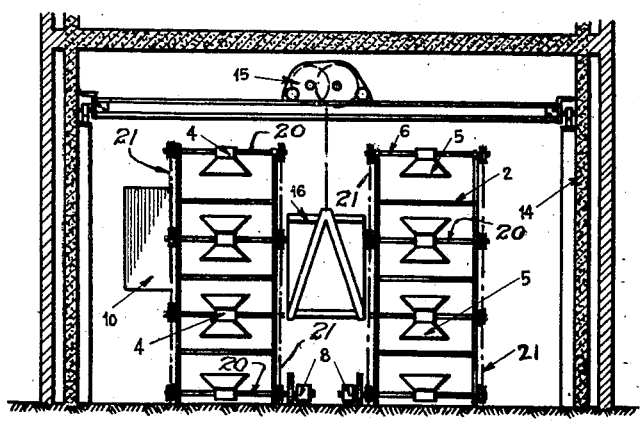

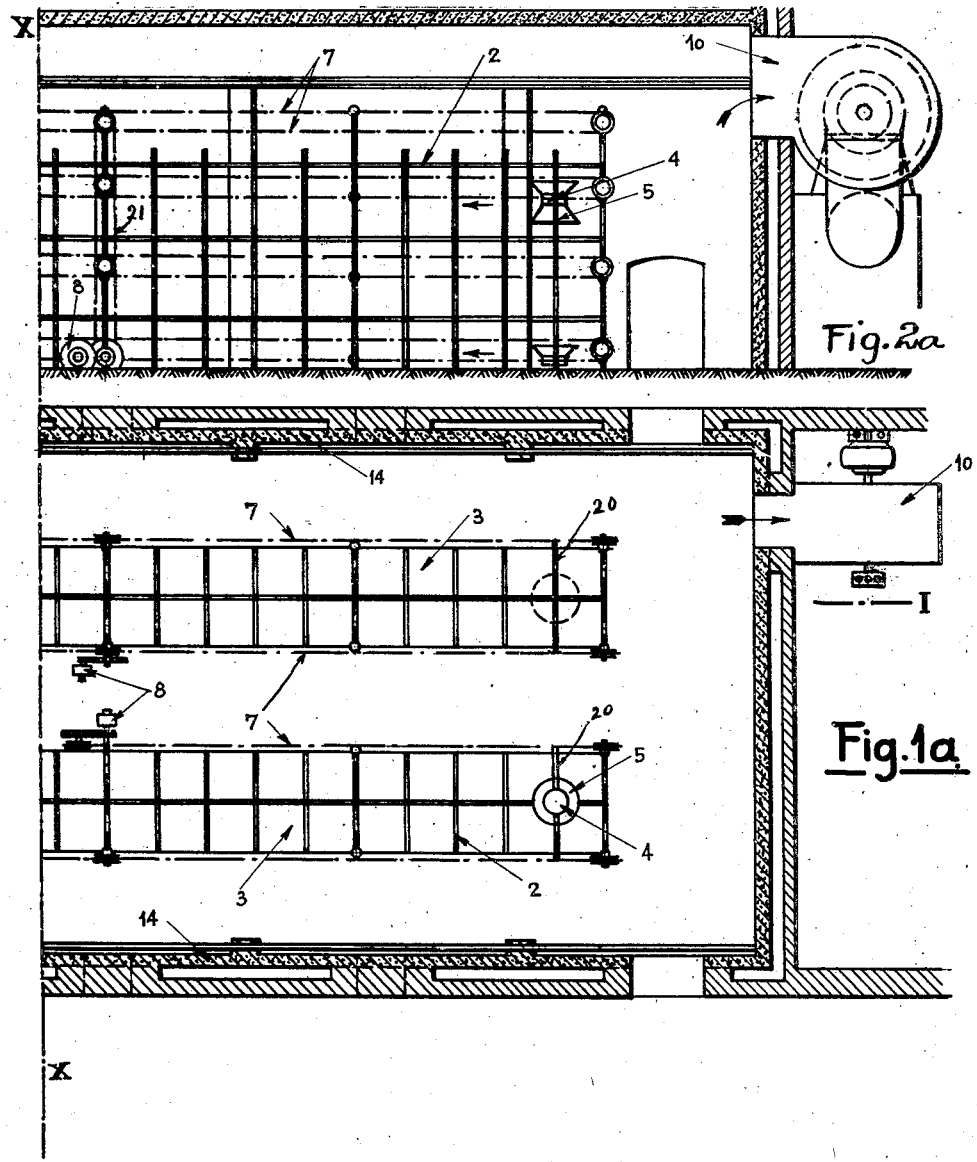

1,911,913

UNITED STATES PATENT OFFICE

JEAN MAYOR, OF LAUSANNE, SWITZERLAND

INSTALLATION FOR THE PRESERVING OF FRUITS AND VEGETABLES BY MEANS OF ULTRA-VIOLET RAYS

Application filed August 12, 1929, Serial No. 385,454, and in Germany August 17, 1928.

The invention refers to an installation for preserving fruits, vegetables and other foods, by means of ultra-violet rays. It is preferable that this preserving should take place in a store wherein an appropriate temperature is maintained. The fruits and vegetables are placed next to each other on superposed tables. As those tables are permeable to the ultra-violet rays and lighted from the top and from beneath, the greatest part of the surface of the fruits is exposed from the time of storing until used, to the continuous action of the ultra-violet rays. The fruits thus treated are preserved until the time of their being used, against any deterioration and especially against rottenness.

The annexed drawings, given as an example, shows schematically one form of execution of such an installation.

Fig. 1 is a plan of a store of the kind provided with the necessary installation, such as it is used for the preserving of juicy fruits as for instance strawberries or the like.

Fig. 1a is a continuation of Fig. 1.

Fig. 2 is a vertical section taken on line I—I of Fig. 1

Fig. 2a is a continuation of Fig. 2, and

Fig. 3 is a transversal section of the store taken on line II—II of Fig. 2.

For instance, if strawberries are to be treated until the time they are best sold, they must be stored at the right time in an appropriate store, the dampness of which must be regulated in such a way as to avoid any drying up of the fruits.

The fruits are placed next to each other on long tables, made for instance of superposed and relatively spaced iron frames 2, the bottom of which is made of glass plates 3, allowing the ultra-violet rays to pass.

Between the frames 2, are provided lighting devices emitting ultra-violet rays, for instance quartz lamps 4, with reflector 5, provided with air supply devices 6, adapted to be placed in a backward and forward motion by means of movement transmitting mechanisms 7, the latter being actioned by a small electro-motor 8.

Each superposed table is fitted as shown in the form of construction given for example, with four lamps placed alternatively over, beneath and between the tables.

For this purpose, any suitable known means may be employed, but I prefer, as shown in the drawings, to use endless cables or chains or the like 7, arranged longitudinally and extending throughout the length of the table frames 2. The cables or chains 7 are connected with transverse shafts 20 supporting the lamps 4. These endless belts or cables are preferably actuated by means of a motor 8 with which they are operatively associated through suitable socket chains, as indicated at 21. The lamp actuating mechanism is provided with reversible gearing for the purpose of alternatively driving the lamps back and forth along the table frames in the manner hereinbefore mentioned. The uppermost lamp irradiates the uppermost table, the second lamp alternating with the first irradiates from beneath the first table and from above the intermediate table; the third lamp, alternating with the second one, irradiates the intermediate table from beneath and the lowermost table from above, and at last, the fourth lamp irradiates the lowermost table from beneath.

The electro-motor 8 is provided with a reversible automatic device to change the direction of motion of each lamp at the end of its travel. Besides, it includes a rheostat allowing to vary the speed of motion of the lamps in order to regulate at will the lasting of radiation.

To facilitate the action of the ultra-violet rays, the gases and the azotized compounds must be evacuated. Those gases are always produced by the action of such rays on the air and are impermeable to the ultra-violet light. It is thus necessary to provide a ventilation device, which comprises a blowing ventilator 9 and an aspirating ventilator 10. Before entering the ventilator 9, the fresh air coming from the exterior passes first through a refrigerating chamber 11 with salt water circulation 12 and a filter 13, provided with a damping device.

In order to keep a regular temperature in the store, the walls thereof are covered with an appropriated insulating facing 14.

To reach the tables, there may be arranged a travelling bridge 15 provided with an elevator platform 16 which can be easily positioned to the desired height between the tables.

The described installation works as follows: The fruits placed next to each other on the glass tables, are exposed to the action of the ultra-violet rays produced by the quartz lamps running on the frames. The irradiation takes place over and under each frame and it is so to speak regular, by the fact that the lamps run constantly at different speeds crossing each other each time at a different place.

When the proportional speed between two lamps is for instance of 10 to 11, there will be ten points of crossing at equal distance.

The fruits thus treated are preserved against any influence of micro-organisms and will not be altered by rottenness. They will be kept sound and fresh, as they are at the time of consummation.

Useless to say that the described installation can be used for the preserving of any other fruits and vegetables. By employing tables made of material permeable to the ultra-violet rays, the fruits and vegetables placed on these tables are not to be removed until the moment of their consummation. The described installation can thus advantageously be used for all fruits and vegetables which cannot bear frequent manipulations or repeated shocks. Strawberries, peaches, apricots, plums, cherries, tomatoes etc. can be treated in the described way.

In certain cases, some changes in the construction could be made, if the nature and the preserving of the fruits and vegetables should need them.

Having now particularly described and ascertained the nature of my said invention and in what manner the same is to be performed, I declare that what I claim is:—

1. An apparatus for preserving fruits and vegetables comprising a plurality of superposed tables having transparent surfaces, ultra-violet ray lamps movably mounted above and below the surfaces of said tables, said lamps being arranged in relation to each other to alternatively move in opposed direction along the tables and between the same, whereby to constantly irradiate the superposed tables from bottom to top through their transparent surfaces, and driving means operatively associated with said lamps to move the same back and forth along the surfaces of said tables.

2. An apparatus for preserving fruits and vegetables comprising a plurality of superposed tables having transparent surfaces, ultra-violet ray lamps movably mounted above and below the surfaces of said tables, said lamps being arranged in relation to each other to alternatively move in opposite directions along the tables and between the same, whereby to constantly irradiate the superposed tables from bottom to top through their transparent surfaces, driving means operatively associated with said lamps to move the same back and forth along the surfaces of said tables, and refrigerating and ventilating means.

In witness whereof I have hereunto set hand.

JEAN MAYOR.